(12) United States Patent
Chandra et al.

(10) Patent No.: US 7,978,652 B2
(45) Date of Patent: Jul. 12, 2011

(54) WIRELESS COMMUNICATIONS ENVIRONMENT OVERLAY

(75) Inventors: Ranveer Chandra, Kirkland, WA (US); Jitendra Padhye, Redmond, WA (US); Lenin Ravindranath Sivalingam, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 12/018,723

(22) Filed: Jan. 23, 2008

(65) Prior Publication Data
US 2009/0185514 A1 Jul. 23, 2009

(51) Int. Cl.
*H04B 7/00* (2006.01)
*H04Q 7/00* (2006.01)
*H04J 3/00* (2006.01)
(52) U.S. Cl. ...... 370/329; 370/310; 370/336; 455/422.1
(58) Field of Classification Search .......... 370/241–392, 370/449–468; 342/463; 340/539.23; 455/422.1; 709/224
See application file for complete search history.

(56) References Cited

U.S. PATENT DOCUMENTS

| | | | |
|---|---|---|---|
| 7,129,891 | B2 | 10/2006 | Meunier |
| 2004/0236850 | A1 | 11/2004 | Krumm et al. |
| 2005/0220106 | A1* | 10/2005 | Raverdy et al. ............... 370/392 |
| 2005/0223086 | A1 | 10/2005 | Raverdy et al. |
| 2006/0008256 | A1 | 1/2006 | Khedouri et al. |
| 2006/0046709 | A1* | 3/2006 | Krumm et al. ............. 455/422.1 |
| 2006/0165035 | A1* | 7/2006 | Chandra et al. ............... 370/329 |
| 2006/0193292 | A1 | 8/2006 | Bansal et al. |
| 2006/0291412 | A1 | 12/2006 | Naqvi et al. |
| 2007/0008922 | A1 | 1/2007 | Abhishek et al. |
| 2007/0140163 | A1* | 6/2007 | Meier et al. ................... 370/329 |

OTHER PUBLICATIONS

AOL Introduces Location Plug-In for Instant Messaging so Users Can See Where Buddies are, Mar. 19, 2007 http://www.theage.com.au/news/Technology/AOL-introduces-location-plugin-for-instant-messaging-so-users-cansee-where-buddies-are/2007/03/19/1174152920852.html. Last accessed Nov. 26, 2007, 2 pages.
Jonh Krumm, et al. The NearMe Wireless Proximity Server, The Sixth International Conference on Ubiquitous Computing, pp. 283-300. Sep. 7-10, 2004, Nottingham, England. https://research.microsoft.com/users/jckrumm/Publications%202004/nearme%20distribute.pdf. Last accessed Nov. 26, 2007, 18 pages.
Ranveer Chandra, et al. Beacon-Stuffing: Wi-Fi without Associations http://research.microsoft.com/users/ranveer/docs/BeaconStuffing.pdf. Last accessed Nov. 26, 2007, 6 pages.

(Continued)

*Primary Examiner* — Afsar M. Qureshi
(74) *Attorney, Agent, or Firm* — Lee & Hayes, PLLC

(57) ABSTRACT

A method is provided, wherein the method comprises identifying nearby wireless communication access points (APs) to which a client computing environment can cooperate with to communicate and receive data through a subscription to a neighborcast group from indentified nearby cooperating access points such that illustratively the neighborcast group comprises a communications overlay between cooperating client computing environments employing the identified nearby wireless communications access points. In an illustrative implementation, a wireless communications environment comprises at least two client computing environments comprising a communications overlay engine operable to process at least one instruction from an exemplary instruction set to perform one or more wireless communications operations over the exemplary communications overlay comprising scanning for cooperating client computing environments and/or wireless access points and/or RSS servers, subscribing to the communications overlay group, and publishing data for consumption by cooperating components of the wireless communications overlay.

20 Claims, 8 Drawing Sheets

OTHER PUBLICATIONS

Chandra et al., "Wi-Fi Neighborcast: Enabling Communication Among Nearby Clients", Networked Systems Design & Implmentation (NSDI), USENIX, Apr. 16, 2008.

Maxemchuk et al., "Reliable Neighborcast", Vehicular Technology, IEEE Transations on, vol. 56, Issue 6, Part 1, Nov. 2007, pp. 3278-3288.

* cited by examiner

US 7,978,652 B2

WIRELESS COMMUNICATIONS ENVIRONMENT OVERLAY

BACKGROUND

The density of Wi-Fi Access Points (APs) has increased rapidly in urban downtowns and enterprise and campus networks. In most scenarios, a Wi-Fi client has the choice to associate with more than one available AP. Therefore, it is increasingly common to find physically nearby Wi-Fi clients that are associated with different APs.

A number of applications can benefit from the ability to send and receive information from nearby clients. For example, clients can perform better AP selection if they have knowledge about the performance of clients associated to neighboring APs. Applications such as "buddies near me" can discover clients that are nearby but associated to another AP. Similarly, geocasting based applications can reach out to more clients in the same region than being limited to only one wireless network.

Existing schemes to enable these applications, however, require significant infrastructure changes or extensive manual profiling. For example, 802.11k modifies the APs and client drivers for better AP selection. BeaconStuffing modifies the APs to send information about load on its network. Further, existing implementations of "buddies near me", such as AOL's buddy list, require extensive wardriving.

Further, current practices do not support, neighborcast, using which nearby clients can communicate with each other even when they are associated to different APs and do not leverage multicast to achieve this functionality. In a contemplated scheme, each AP can be assigned a globally unique multicast group ID, and a Wi-Fi client with an IP address joins the multicast group corresponding to all APs around it. Multicast functionality using either IP multicast, Application Level Multicast or a web-server based scheme using RSS feeds can also be implemented.

Unlike existing practices, neighborcast does not require any modifications to the APs or kernel-level software changes at the clients. Furthermore, by using IP multicast or Application Level Multicast, neighborcast traffic generated by a Wi-Fi client is local, i.e., propagates only to nearby APs. Neighborcast, when deployed, can be more scalable than a completely centralized publish/subscribe based scheme.

From the foregoing it is appreciated that there exists a need to overcome the shortcomings of existing practices as it pertains to wireless communications network to enable neighborcast.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

In one aspect, a method is provided, wherein the method comprises identifying nearby wireless communication access points (APs) to which a client computing environment can cooperate with to communicate and receive data. In an illustrative implementation, the method further comprises creating a neighborcast group from indentified nearby cooperating access points such that illustratively the neighborcast group comprises a communications overlay between cooperating client computing environments employing the identified nearby wireless communications access points.

In an illustrative implementation, a wireless communications environment comprises at least two client computing environments comprising a communications overlay engine operable to process at least one instruction from an exemplary instruction set to perform one or more wireless communications operations over the exemplary communications overlay comprising scanning for one or more access points, subscribing to a wireless communications overlay group, and publishing data about the performance and load of one or more wireless communications channels with one or more cooperating client computing environments and/or wireless access points and/or RSS computing environment servers for use in selecting and/or maintaining a wireless communication session for communicating data between cooperating client computing environments.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
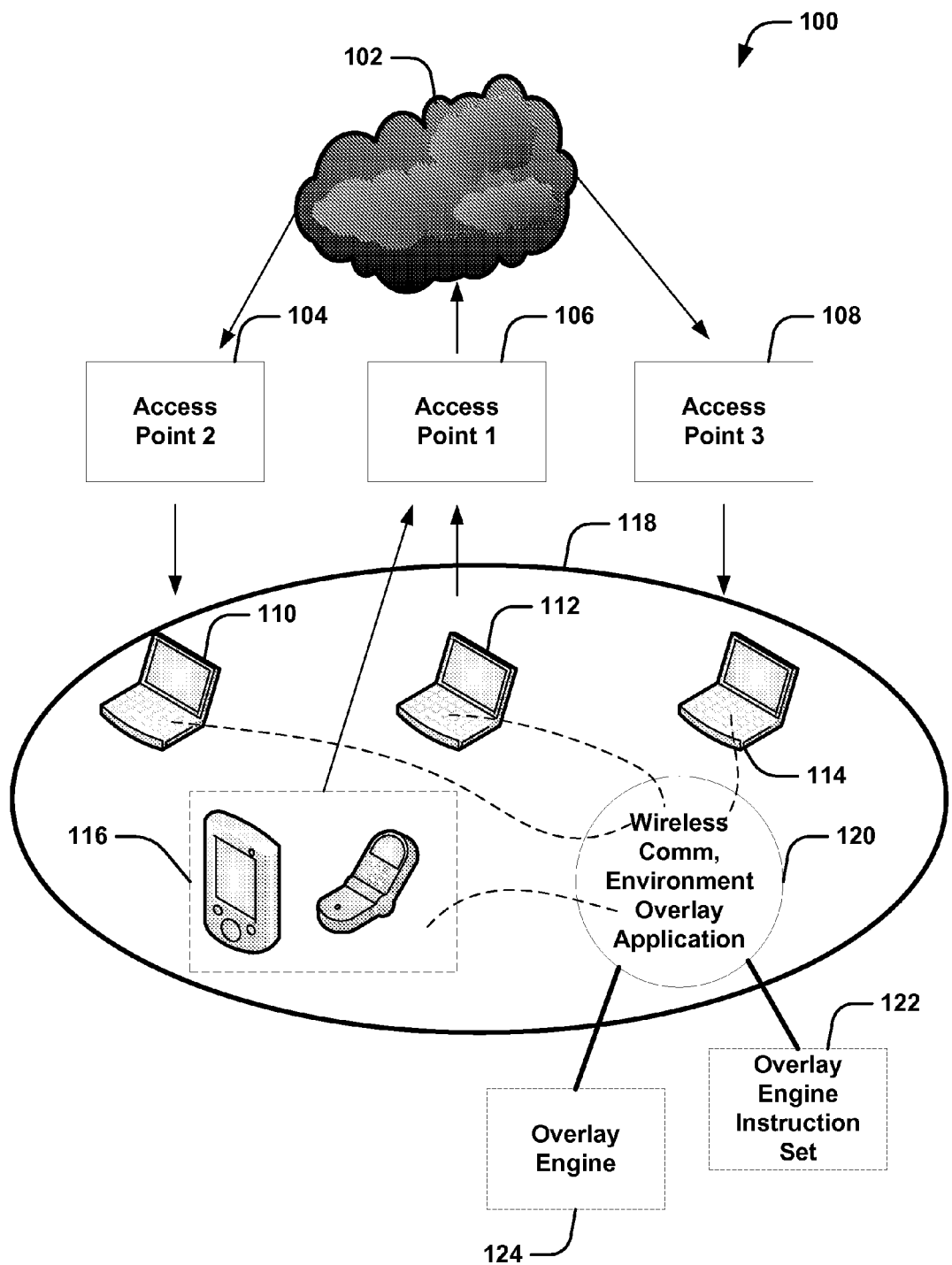
FIG. 1 is a block diagram of an illustrative implementation of an exemplary WI-FI environment supporting neighborcasting.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Overview: Neighborcast

FIG. 1 shows the cooperation of exemplary components of illustrative wireless communications environment 100. As is shown in FIG. 1, exemplary wireless communications environment comprises communications network 102 (e.g., local area network (LAN), the Internet, wide area network (WAN)), access point-1 106, access point-2 104, access point-3 108, client computing environments 110, 112, and 114, respectively, and other client computing environments 116 (as indicated in by the dashed box). In an illustrative implementation, other client computing environments can comprise personal digital assistants (PDAs), mobile phones, and other portable electronic devices capable of wireless communications. Further, as is shown in FIG. 1, wireless communications environment 100 comprises wireless communications environment overlay 118 that illustratively operatively can be created through the cooperation of one or more components of wireless communications environment 100. As is shown in FIG. 1, client computing environments 110, 112, 114, and 116 are operative to execute wireless communications environment overlay application 120. Illustratively, wireless communications environment overlay application 120 further comprises overlay engine 124 and overlay engine instruction set 122.

In an illustrative implementation, wireless communications environment overlay 118 (e.g., neighborcast) can enable client computing environments 110, 112, and 114 (or other client computing environments 116) to discover and communicate with other nearby client computing environments 110, 112, and 114 (or other client computing environments 116), irrespective of the AP (e.g., access point-1 106, access point-2 104, access point-3 108) they are associated with. Illustratively, neighborcast can be operative as wireless communications environment overlay application 120 which executes overlay engine 124 processing at least one instruction from overlay engine instruction set to perform one or more neighborcast operations.

In the illustrative implementation, two wireless client computing environments (e.g., 110, 112, 114, or 116) can be considered to be "near" each other if the wireless client computing environments (e.g., 110, 112, 114, or 116) can receive wireless transmissions from a common access point (e.g., 104, 106, or 108). In the illustrative implementation, two client computing environments (110, 112, 114, or 116) can be considered "near" also in the case when the client computing environments (e.g., 110, 112, 114, or 116) are associated to different access points (e.g., 104, 106, or 108) on different frequency channels. Furthermore, in the illustrative implementation, neighborcast (e.g., wireless communications environment overlay 118) can achieve additional range than provided by each individual access point (e.g., 104, 106, or 108) given that two client computing environments (e.g., 110, 112, 114, or 116) are capable of communicating with each other when they are not in communication range of each other given that they can communicate with a common access point (104, 106, or 108). It is appreciated that access point can also comprise a client computing environment acting as an access point for other cooperating client computing environments and/or access points.

In an illustrative implementation, neighborcast (e.g., wireless communications environment overlay 118) can be deployed as an extension of multicast groups. In an illustrative operation, a globally unique group identifier (ID) can be assigned to cooperating access points (104, 106, or 108) which, illustratively, can be derived from the cooperating access point's unique basic service set identifier (BSSID). In the illustrative operation, cooperating client computing environments (e.g., 110, 112, 114, or 116) can subscribes to loins) an exemplary multicast group for cooperating access points (e.g., 104, 106, or 108) that the cooperating client computing environments (e.g., 110, 112, 114, or 116) is capable of discovering as part of a process to discover cooperating access points (e.g., 104, 106, or 108). In the illustrative operation, one or more of the cooperating client computing environments can operate to publish updates (e.g., date representative of the client computing environment's presence and/or performance) on the multicast group of the access point to which it is associated.

As is shown in FIG. 1, client computing environments 110, 112, 114 or 116 can operate within range of access point-1 106 and join a neighborcast group 118 (e.g., even if client computing environments 110, 112, 114, or 116 are associated with different access points—i.e., as is shown, client computing environment 110 is shown to be associated with access point-2 110, client computing environment 112 is shown to be associated with access point-2 106, client computing environment 114 is shown to be associated with access point-3 108, and other client computing environments 116 are shown to be associated with access point-1 106). In an illustrative operation, neighborcast (e.g., wireless communications environment overlay 118) can allow client computing environments (110, 112, 114, or 116) to communicate with each other using, in an illustrative operation, a common neighborcast group 118 (e.g., corresponding to access point-1 106).

In the illustrative implementation in which wireless communications operations are deployed to create a wireless communications environment overlay, neighborcast can illustratively operate to construct an Internet protocol (IP) overlay among physically near wireless client computing environments (e.g., 110, 112, 114, or 116). In the illustrative implementation, the IP overlay can span different wireless communications environments and frequency channels. Illustratively, an update published by a cooperating client computing environment (e.g., 110, 112, 114, or 16) on its access point's (e.g., 104, 106, or 108) multicast group (e.g., 118) can be operatively be received by cooperating client computing environments (e.g., 110, 112, 114, or 116) in range of the access point (e.g., 104, 106, or 108) whether the cooperating client computing environments (110, 112, 114, or 116) are associated with an access point different from the access point associated with the broadcasting client computing environment. In the illustrative implementation, neighborcast can be extended to estimate relative distances of nearby cooperating client computing environments.

In the illustrative implementation, a multicast group identifier of an access point can correspond to an IP multicast address (e.g., 228.xxx.xxx.xxx), which can be derived from the access point's globally unique BSSID. Illustratively, operatively, such mapping from a 6-byte BSSID to 3 bytes in the multicast IP address can be processed by reusing the last 3 bytes of the access point's BSSID. For example, a BSSID of 00:17:95:81:CA:30 can correspond to a multicast IP address of 228.129.202.48 (as 0x81=129, 0xCA=202, 0x30=48).

In an illustrative operation, a client computing environment operatively maps a BSSID of cooperating access points (e.g., access points that the client computing environment can connect) as part of an illustrative scanning process to a corresponding multicast IP address. In the illustrative operation, the client computing environment can then subscribes to identified multicast groups and can publish information on the IP multicast group of the access point it is associated with.

In an illustrative implementation, neighborcast (i.e., communication of data using a wireless communications environment overlay) can be deployed using application level multicast (ALM) to accommodate cooperating access points that are not part of a given sub-network (e.g., in residential and shopping areas). In an illustrative implementation, a rendezvous server can be provided for discovery and management of group membership across multicast groups.

In the illustrative implementation, an ALM scheme can be implemented multicast. In an illustrative operation, to join a multicast group, a cooperating client computing environment can contact a rendezvous server (central controller)(not shown), which can operatively reply with a list of IP addresses of cooperating client computing environments that are members of the group. An update can also be illustratively communicated to the cooperating client computing environments in the group with the new client computing environment's IP Address. Cooperating client computing environments can multicast data by uni-casting separately to cooperating client computing environments in the multicast group. Similarly when a cooperating client computing environment leaves a group, it can operatively inform the rendezvous server, which can then send this update to other cooperating client computing environments in the group. Cooperative client computing environments that are part of a multicast group can also send periodic "heartbeat" messages to the exemplary rendezvous server (not shown) to inform them their existence.

Figure 2:
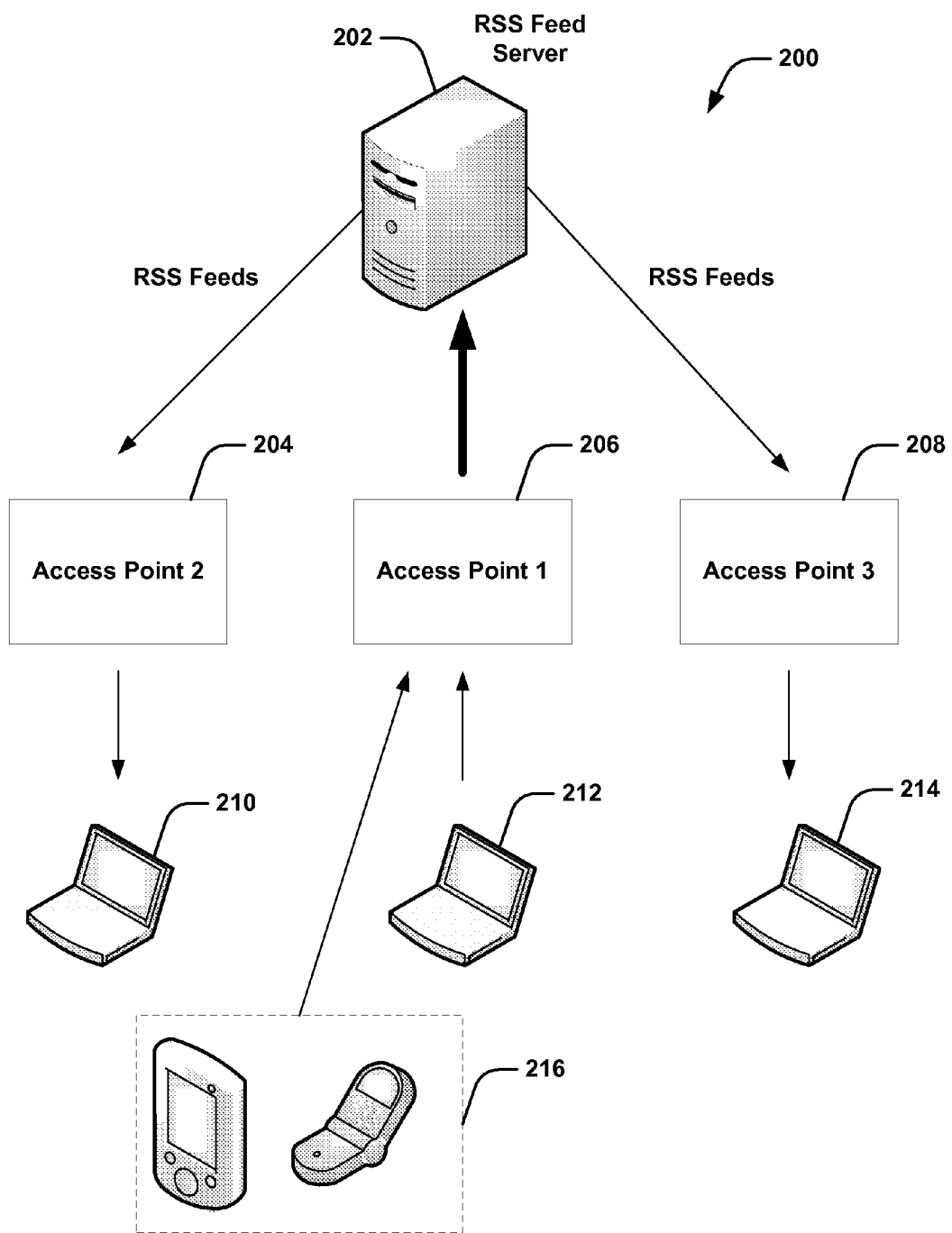
FIG. 2 is a block diagram of an illustrative implementation of another exemplary WI-FI environment supporting neighborcasting using RSS feeds.

FIG. 2 shows another illustrative implementation of an exemplary wireless communications environment 200 operative to facilitate data communications. As is shown in FIG. 2, exemplary wireless communications environment 200, comprises RSS feed server 202, access point-1 206, access point-2, 204, access point-3 208, and client computing environments 210, 212, 214, and 216. In the illustrative implementation, a web server can be deployed on the Internet, on which cooperating access points (e.g., 204, 206, and 208) have a corresponding web feed. Illustratively, a web feed can be identified by an XML file. In an illustrative operation, the link for the XML file can be obtained using one of the cooperating access points' (e.g., 204, 206, or 208) BSSID. For example, an exemplary web feed of a cooperating access point with BSSID 00:17:95:81:CA:30 is http://webserver/N00 17 95 81 CA 30.xml. Cooperating client computing environments (e.g., 210, 212, 214, or 216) associated to a cooperating access point (e.g., 204, 206, or 208) can publish items on the web server. In the illustrative operation, cooperating client computing environments (e.g., 210, 212, 214, or 216) in the range of a cooperating access point (e.g., 204, 206, or 208) can employ its BSSID to subscribe to the RSS feeds from the cooperating access point (e.g., 204, 206, or 208). In an illustrative operation, communication between one or more cooperating access points (e.g., 204, 206, or 208) can communicate with RSS feed server 202 can occur over hyper text transfer protocol (HTTP).

Figure 3:
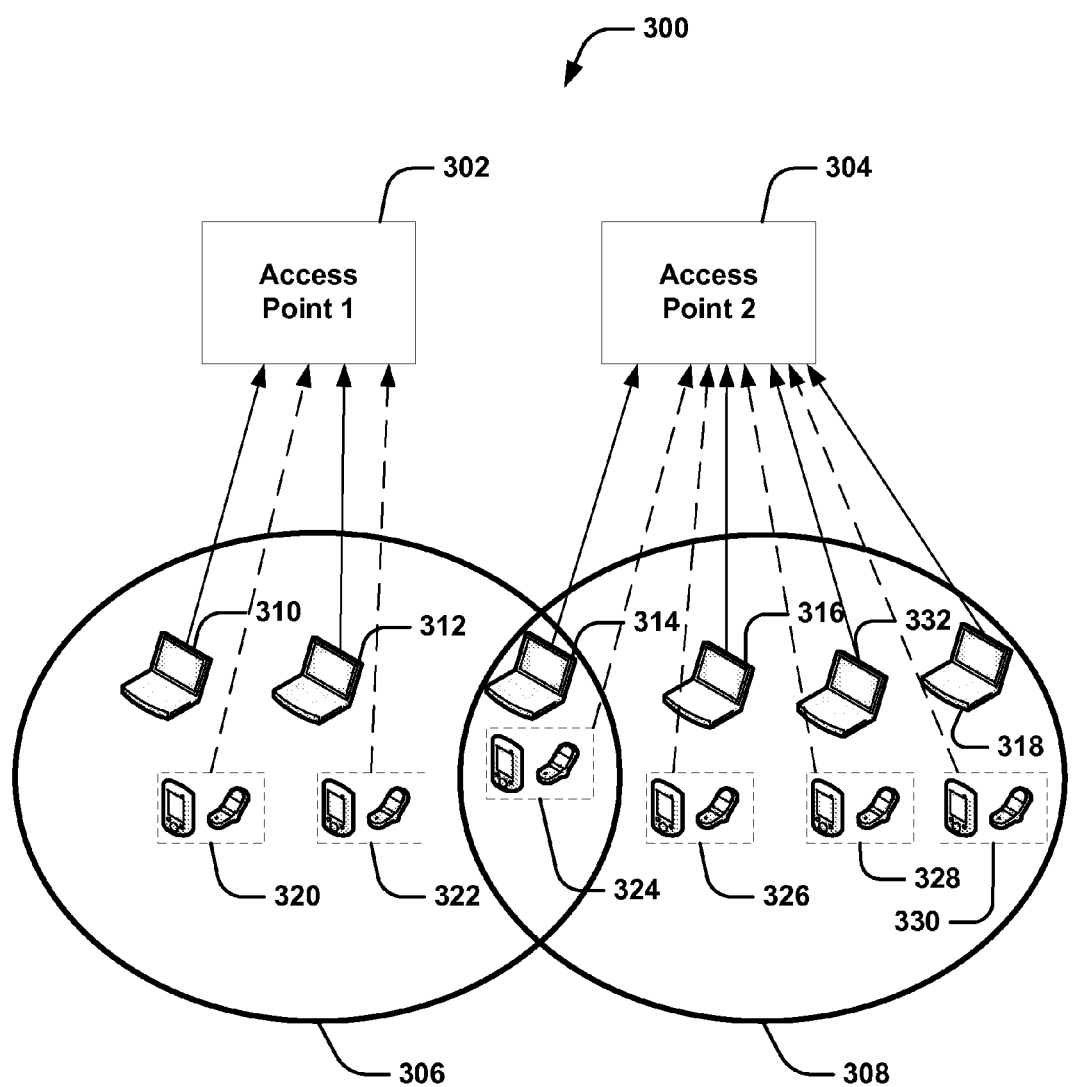
FIG. 3 is a block diagram of an illustrative implementation of another exemplary WI-FI environment supporting neighborcasting allowing for improved user association in a wide area network communications environment.

FIG. 3 shows another illustrative implementation of an exemplary wireless communications environment 300 operative to facilitate data communications. As is shown in FIG. 3, exemplary wireless communications environment 300 comprises access point-1 302, access point-2 304, neighborcast group 306 having client computing environments 310, 312, 320, 322, 324, and 314, and neighborcast group 308 having client computing environments 314, 324, 326, 316, 328, 332, 317, and 330. As is shown in FIG. 3, certain of client computing environments 314 and 324 can subscribe to both neighborcast groups 306 and 308.

In an illustrative implementation, client computing environment 310 and 312 can be associated with access point-1 302 and client computing environments 316, 322, and 318 can be associated with access point-2 304. In the illustrative implementation client computing environment 314 can be in the range of access point-1 302 and can subscribes to its neighborcast group 306. Using the information published in both neighborcast groups 306 and 308, client computing environment 314 can receive data of load on both access points 302 and 304 and the channel characteristics of access points 302 and 304. Using the received data, client computing environment 314 can determine which access point 302 or 304 client computing environment 314 can best associate with.

Figure 4:
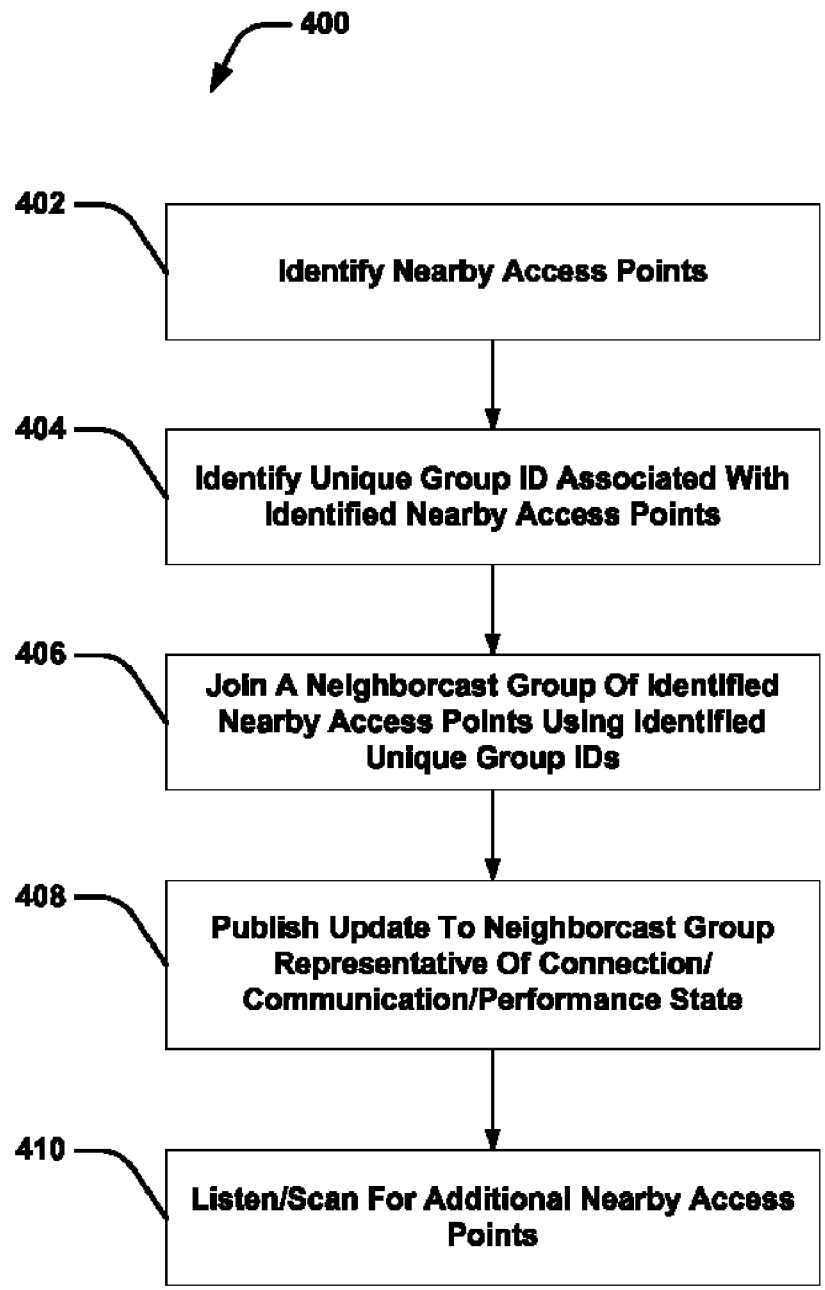
FIG. 4 is a block diagram showing exemplary processing performed to establish a multicast group in a WI-FI neighborcast enabled environment.

FIG. 4 shows an exemplary method 400 to facilitate communications between cooperating components of a wireless communications environment. As is shown, processing begins at block 402 where nearby access points are identified. Processing then proceeds to block 404 where a unique group identification associated with identified nearby access points is identified. From there, processing proceeds to block 406 where a neighborcast (e.g., wireless communications environment overlay) group of identified nearby access points using identified unique group identifications (IDs) is joined by a cooperating client computing environment. Processing then proceeds to block 408 where an update is published to the neighborcast group where the update is representative of connection/communication/performance state of the cooperating computing environment and/or access point. Additional nearby access points are then scanned for at block 410.

Figure 5:
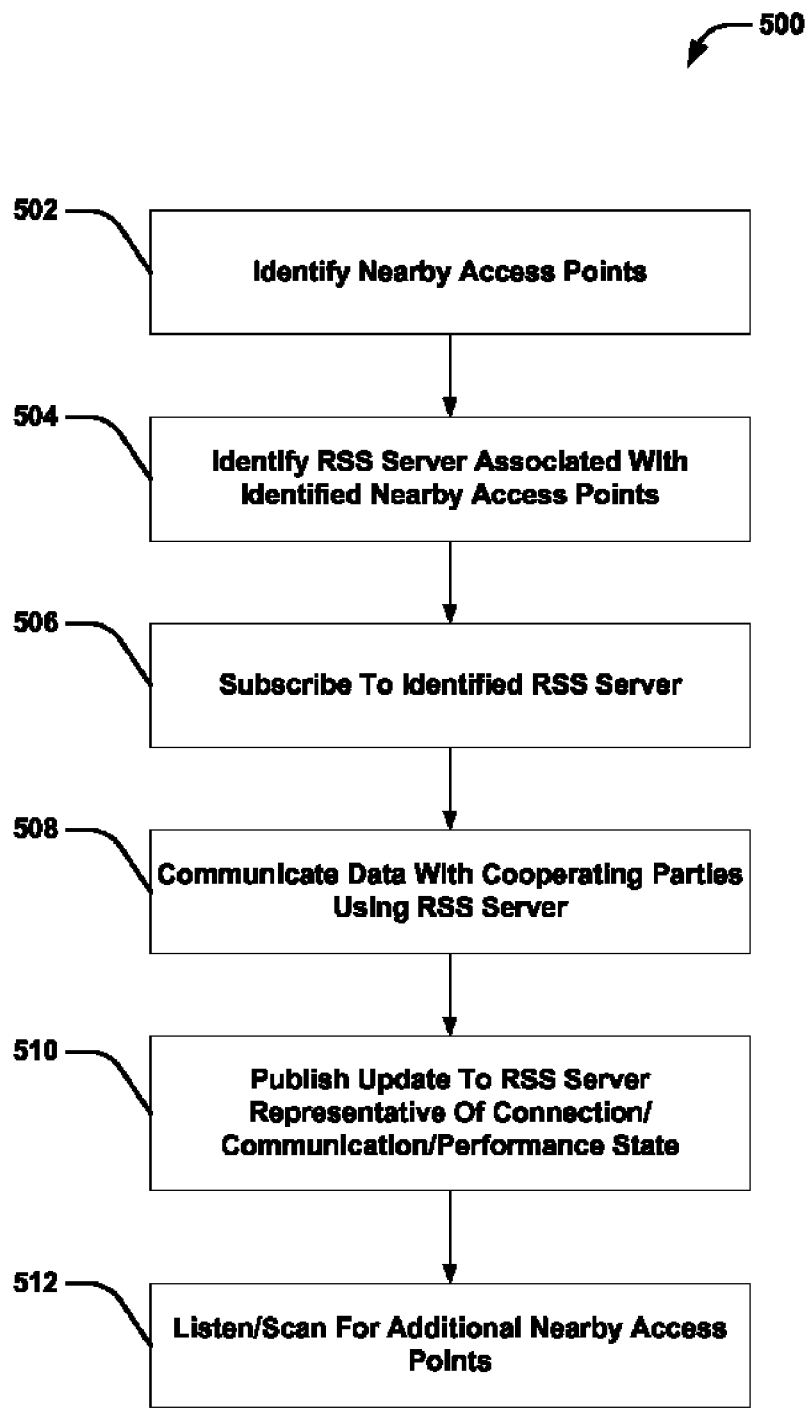
FIG. 5 is a block diagram showing exemplary processing performed to realize neighborcasting using RSS feeds in an exemplary WI-FI neighborcast enabled environment.

FIG. 5 shows an exemplary method 500 to facilitate communications between cooperating components of a wireless communications environment utilizing an RSS server computing environment. As is shown, processing begins at block 502 where nearby access points are identified 502. Processing then proceeds to block 504 where a really simple syndication (RSS) server associated with nearby access points is identified. A subscription is then performed with the identified RSS server (e.g., by one or more cooperating client computing environments) at block 506. Data is then communicated with cooperating parties using the identified RSS server at block 508. An update is then published at block 510 to the RSS server which is representative of connection/communication/performance state. Additional nearby access points are listened for and scanned for at block 512.

Figure 6:
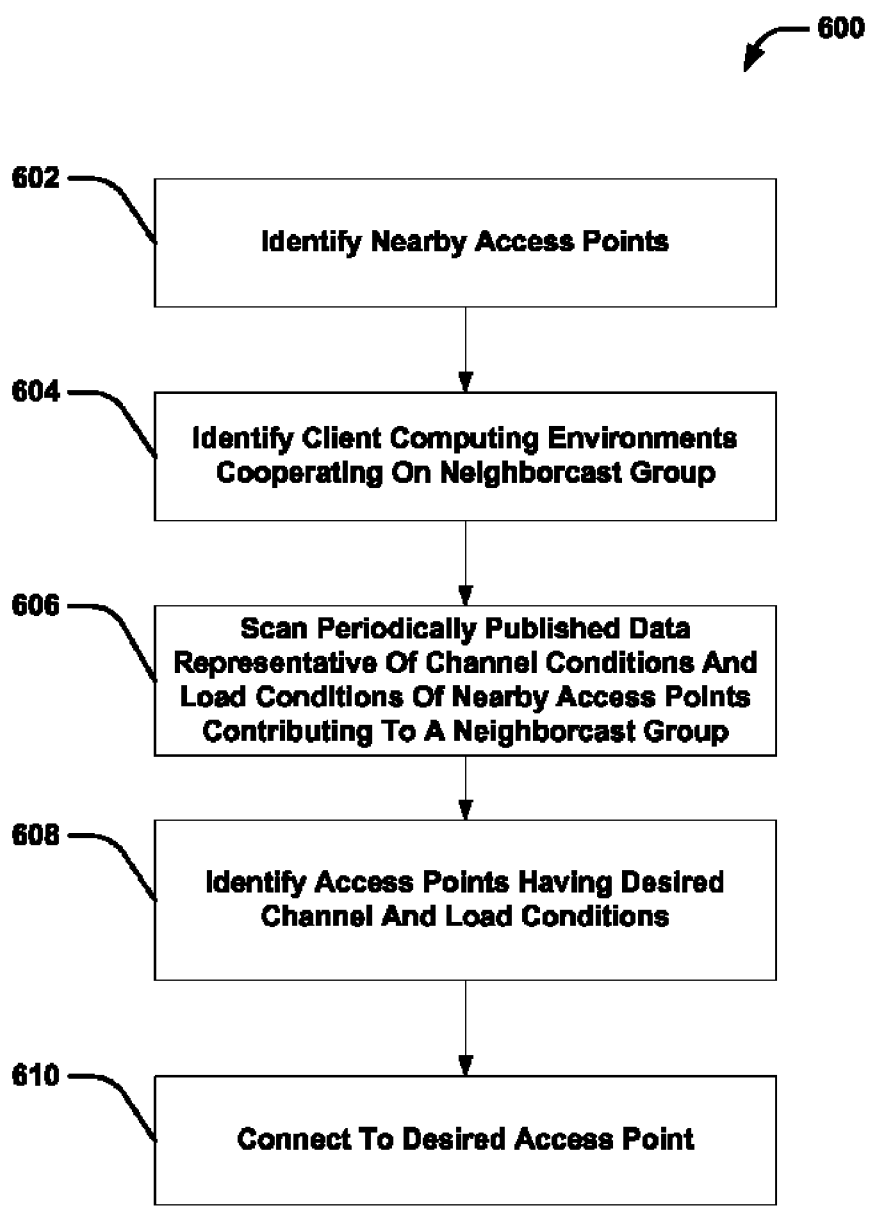
FIG. 6 is a block diagram showing exemplary processing performed to improve user association in WLAN using exemplary neighborcast processing.

FIG. 6 shows an exemplary method 600 to facilitate communications between cooperating components of a wireless communications environment. As is shown, processing begins at block 602 where nearby access points are identified. From there processing proceeds to block 604 where client computing environments cooperating on a neighborcast group is identified. Periodically published data representative of channel conditions and load conditions of nearby access points contributing to the neighborcast group is scanned for at block 606. Access points having desired channel and load conditions are identified at block 608. From there processing proceeds to block 610 where the desired access point (or access points) are connected to by a cooperating client computing environment.

In an illustrative operation, cooperating client computing environments can employ IP multicast for communication. In other illustrative operations, ALM or RSS feeds can also be utilized. In the illustrative operation, when a client computing environment associates with an access point, it illustratively, operatively, can derive the multicast IP address of the group for that access point and can join the multicast group. Illustratively, the cooperating client computing environment can periodically publishes information about channel conditions and load on the multicast group. The information can illustratively includes signal strength of access points' beacons as processed by cooperating client computing environments, a summary of traffic generated by the cooperating client computing environment in a selected time period, and an estimate of RTT to the first hop gateway on the subnet can be generated and communicated among cooperating client computing environments.

In the illustrative operation, the cooperating client computing environment can also scan for access points around the cooperating client computing environment and can subscribe to their multicast groups as well. In the illustrative operation, the cooperating client computing environment can receive information about (i) load generated by other clients on the cooperating access point it is associated with (ii) channel conditions and load information on other nearby access points. Based on this information, the cooperating client computing environment can determine to switch to another access point.

In an illustrative implementation, access point selection can be generalized to a cooperative problem diagnosis. Cooperating client computing environments can use neighborcast to cooperate with other cooperating client computing environments nearby to diagnose and localize problems in the exemplary wireless communications environment in an automated manner. In the illustrative implementation, neighborcast can be used to propagate information. For example, when a cooperating client computing environment is experiencing poor connectivity, it can collaborate with other client computing environments associated to its access point and cooperating client computing environments associated to nearby access points to diagnose and localize the problem. The problem can be localized to the gateway, to the access point, to a wireless software/hardware component of the cooperating client computing environment, or to cooperating client computing environment's physical location.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
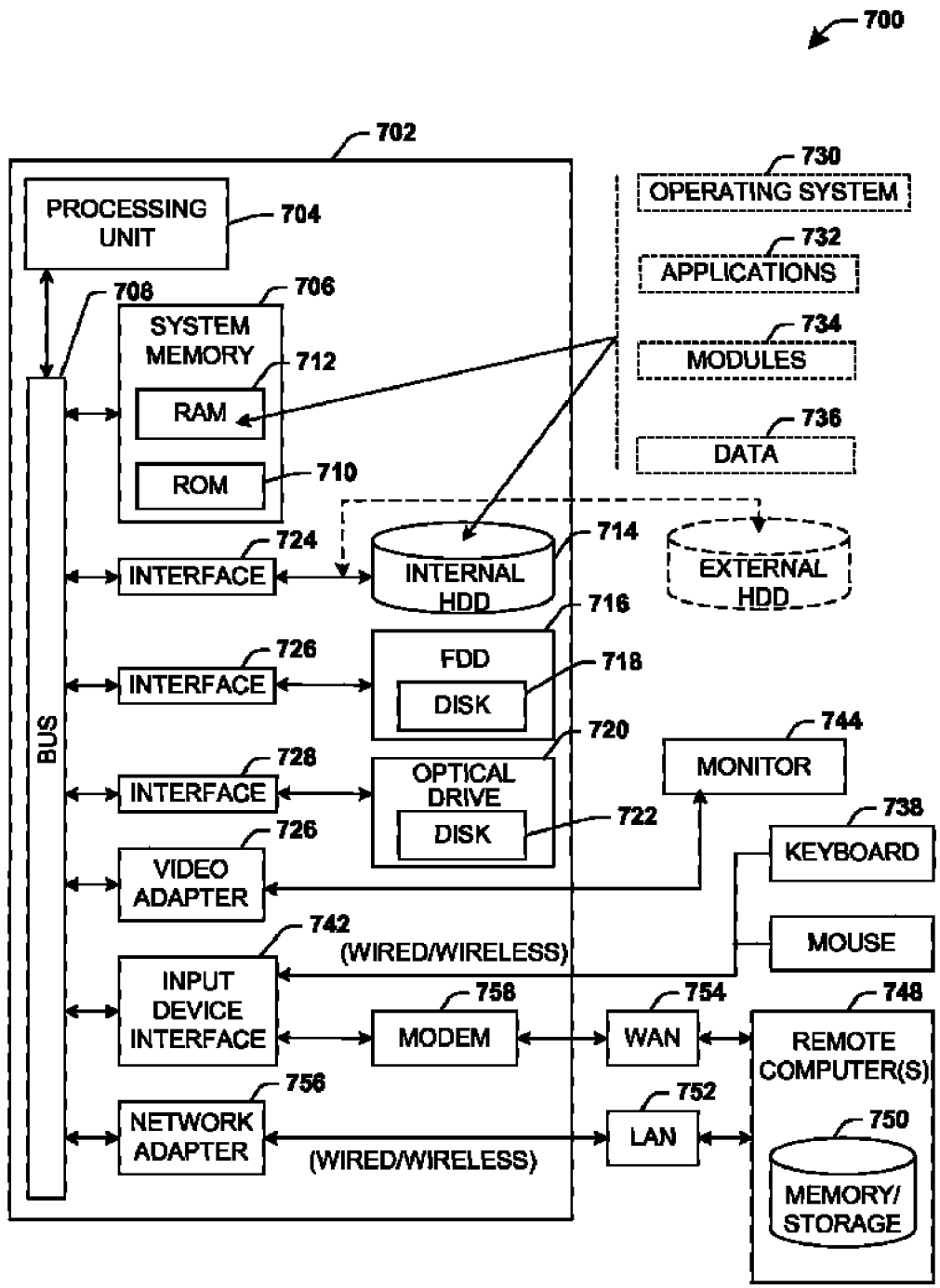
FIG. 7 is a block diagram of an exemplary networked computing environment in accordance with various aspects described herein.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
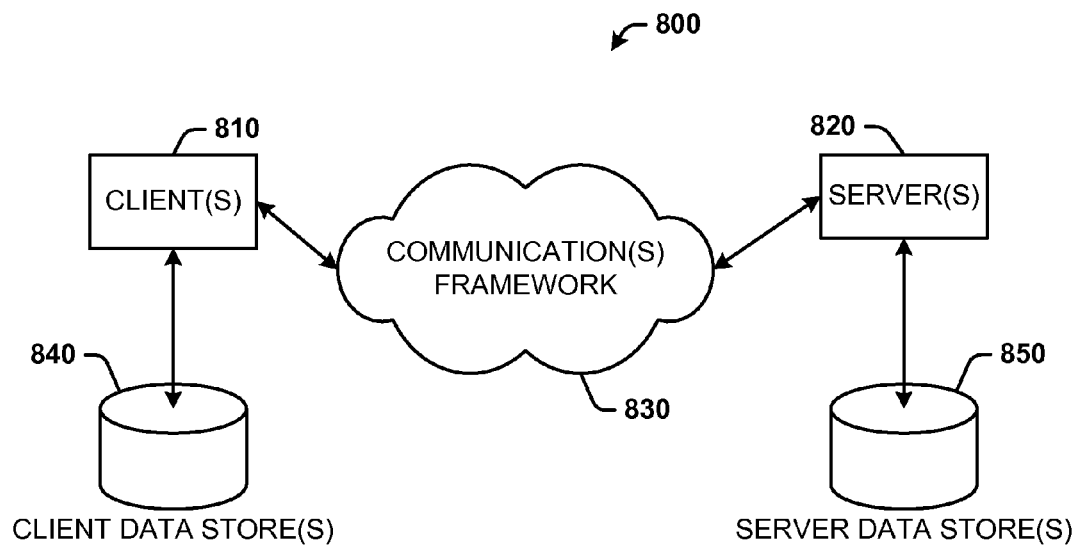
FIG. 8 is a block diagram of an exemplary computing environment in accordance with various aspects described herein.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to communicate data across wireless communications environment, the method comprising:
   identifying one or more nearby access points using unique identifiers of the one or more nearby access points; and
   subscribing to the one or more nearby cooperating access points to generate a neighborcast group; and
   publishing data operable to be received and/or processed by one or more components of the neighborcast group.

2. The method as recited in claim 1, further comprising: communicating data between two or more client computing environments using the generated neighborcast group.

3. The method as recited in claim 1, further comprising generating the neighborcast group or publishing data over it using one or more IP multicasting operations.

4. The method as recited in claim 1, further comprising generating the neighborcast group by deploying an RSS feed server.

5. The method as recited in claim 4, further comprising subscribing to one or more access point identifiers the RSS feed server for data communications.

6. The method as recited in claim 5, further comprising communicating data among one or more client computing environments through the one or more access points and the RSS feed server.

7. The method as recited in claim 1, further comprising receiving data representative of one or more access point performance from one or more client computing environments to determine which of the one or more access points to associate with.

8. The method as recited in claim 7, further comprising publishing data by one or more client computing environments over the neighborcast group about the performance of an access point to which the one or more client computing environments has an association.

9. The method as recited in claim 1, further comprising publishing data representative about one or more client computing environments presence within the wireless communications environment.

10. Volatile or non-volatile computer readable storage media having computer readable instructions to instruct a computer to perform a method comprising:
identifying one or more nearby access points using unique identifiers of the one or more nearby access points;
subscribing to the one or more nearby access points to generate a neighborcast group; and
publishing data operable to be received and/or processed by one or more components of the neighborcast group.

11. A system for facilitating communications in a wireless communications environment comprising:
a wireless communication environment overlay engine operable to coordinate the communication of data between two or more nearby client computing environments using a wireless communications environment overlay comprising an overlay operable to communicated, data using Internet Protocol (IP) between two or more nearby client computing environments; and
an instruction set comprising at least one instruction to instruct the wireless communication environment overlay engine to process data representative of operational features of the two or more nearby client computing environments to establish a neighborcast group for the two or more client computing environments, wherein the neighborcast group is operable on a wireless communications network wherein one of the two or more client computing environments maintains wireless communications environment associations different than the other of the two or more client computing environments.

12. The system as recited in claim 11, further comprising two or more access points operable on the wireless communication environment to communicate data with and between client computing environments over the neighborcast group.

13. The system as recited in claim 12, wherein the neighborcast group is established through the deployment of one or more Internet Protocol (IP) multicasting operations.

14. The system as recited in claim 12, wherein the neighborcast group is ,established through the deployment of one or more application level multicasting (ALM) operations.

15. The system as recited in claim 12, wherein the two or more access points are operating on different wireless communications environment communications channels.

16. The system as recited in claim 15, wherein the two more client computing environments are operable to join more than one neighborcast group deployed across the wireless communications channel and operable on the two or more access points.

17. The system as recited in claim 11, further comprising a really simple syndication (RSS) feed computing server environment operable to cooperate with the two or more client computing environments to communicate data over the neighborcast group.

18. The system as recited in claim 11, wherein the two or more client computing environments operate to publish data representative of the operational features of the two or more client computing environments over the neighborcast group.

19. The system as recited in claim 11, wherein the wireless communications environment overlay engine comprises a computing application.

20. The system as recited in claim 19, wherein the computing application is operable on the two or more client computing environments.

* * * * *